Feb. 16, 1954
H. K. SPAULDING
2,669,669
ELECTRIC IMPULSE GENERATOR
Filed July 22, 1952
2 Sheets-Sheet 1
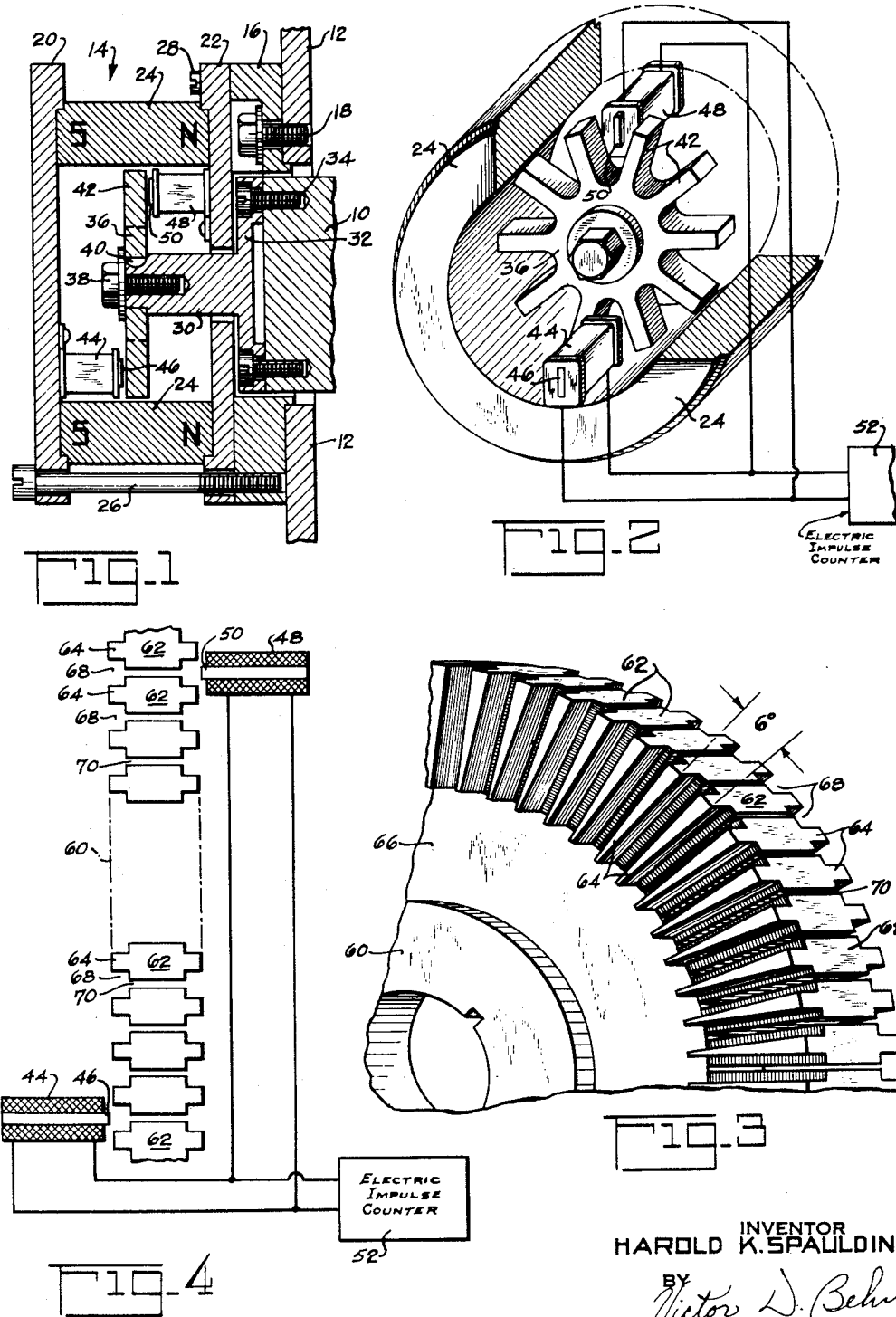
INVENTOR
HAROLD K. SPAULDING
BY
Victor D. Behn
ATTORNEY

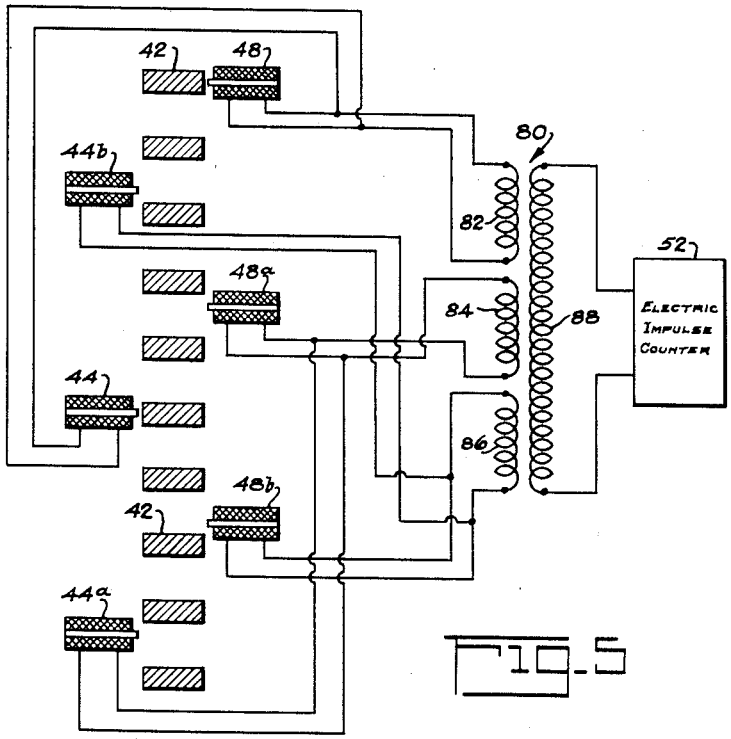

Patented Feb. 16, 1954

2,669,669

UNITED STATES PATENT OFFICE 2,669,669

ELECTRIC IMPULSE GENERATOR

Harold K. Spaulding, Hohokus, N. J., assignor to Curtiss-Wright Corporation, a corporation of Delaware Application July 22, 1952, Serial No. 300,311

9 Claims. (Cl. 310—155)

This invention relates to electric impulse generators and is particularly directed to such generators for use in providing an electric signal having a frequency proportional to the rotative speed of a rotating member.

The invention has been designed for use in connection with a turbo-jet aircraft engine for providing an electric signal, having a frequency proportional to the speed of rotation of the engine. As will appear, however, the invention is not limited to this specific use. Turbo-jet aircraft engines operate at speeds as high as 10,000 revolutions per minute (R. P. M.). Particularly for testing such engines it is desirable to have an accurate knowledge of engine R. P. M. not only during its high speed operation but at all speeds down to speeds as low as 100 R. P. M.

An object of the present invention comprises the provision of a novel and simple electric impulse generator proving an alternating or pulsating electric voltage having a frequency proportional to the speed of generator rotation with the amplitude of each pulse being sufficient at low speeds, as for example 100 R. P. M., for accurate speed measurement by counting said pulses and without said amplitude becoming excessive at speeds as high as 10,000 R. P. M. A further object of the invention comprises the provision of such an electric generator in which the generator output is substantially free from outside interference.

Other objects of the invention will become apparent upon reading the annexed detailed description in connection with the drawing in which:

Fig. 1 is an axial sectional view illustrating an electric impulse generator embodying the invention;

Fig. 2 is a schematic perspective view illustrating the main components of Fig. 1 with the pick-up coils electrically connected together to an electric impulse counting mechanism;

Fig. 3 is a perspective view of a portion of a modified rotor construction;

Fig. 4 is a development of the rotor teeth of Fig. 3 and illustrating the electric pick-up coils electrically connected together to an electric impulse counting mechanism; and Fig. 5 is a schematic view of a modification of Figs. 1 and 2 providing a higher frequency electric output with the same generator rotor.

Referring first to Figs. 1 and 2 of the drawing, a shaft 10, whose speed is to be measured, extends through a casing wall 12. An electric impulse generator 14 is secured directly to the casing wall 12 by means of an adapter plate 16. The adapter plate 16 is secured to the wall 12 by screws 18.

The generator 14 comprises a pair of end plates 20 and 22 between which a hollow cylindrical permanent magnet 24 is disposed. The magnet 24 is a high strength permanent magnet and may be made of Alnico metal. As illustrated the magnet has a north pole at one end and a south pole at its other end. The generator end plates 20 and 22 and cylindrical magnet 24 are clamped together and are secured to the adapter plate 16 by long screws 26 threaded into said adapter plate. In addition the generator end plate 22 is secured directly to the adapter plate by screws 28.

A stub shaft 30 of non-magnetic material, such as brass, has a flange 32 for co-axially securing said non-magnetic shaft 30 to the shaft 10 by screws 34. The non-magnetic shaft 30 extends through the generator end plate 22. A rotor disc 36 of ferromagnetic material is secured to the end of the shaft 30 by means of a screw 38 and spline 40. It has been found satisfactory to make the rotor 36 and generator end plates 20 and 22 of a mild steel such as an S. A. E. 1010 steel.

The rotor 36 comprises a central or hub portion from which a plurality of circumferentially-spaced tooth-like projections 42 extend radially. As illustrated the teeth or projections 42 are equally spaced and there are an even number of said projections or teeth. A first electric pick-up coil 44 is secured to the end plate 20. This coil has a core 46 of ferromagnetic material. One end of the core 46 is disposed adjacent to the path of rotation of the rotor teeth 42 and the other end of said core abuts the generator end plate 20 to provide a connection of low magnetic reluctance between said core and the south pole of the magnet 24. A second electric pick-up coil 48 similar to the coil 44 is disposed on the opposite side of the rotor 36 from the coil 44 and, relative to the rotor axis, the second coil 48 is disposed diametrically opposite to the first coil 44. The second coil 48 is secured to the generator end plate 22 and said second coil 48 has a core 50 of ferromagnetic material. One end of the core 50 is disposed adjacent to the path of rotation of the rotor teeth 42 and its other end abuts the generator end plate 22 to provide a connection of low magnetic reluctance between said core and the north pole of the magnet 24.

The rotor 36 is disposed mid-way between the ends of the magnet 24 so that the clearance between the path of rotation of the rotor teeth 42 and the core 46 of the coil 44 is the same as the clearance between said path of rotation and the core 50 of the coil 48. A clearance of 0.006 to 0.002 inch between the path of the rotor teeth 42 and the coil cores has been found to be satisfactory. Suitable shims may be placed between the stub shaft 30 and the shaft 10 for properly positioning the rotor 36.

The electric coils are electrically connected together preferably in parallel with their generated voltages in phase and said parallel connected coils are connected to an electric impulse counter 52 such as are commercially available for counting electric pulses over predetermined time intervals. With an even number of rotor teeth and with the coils 44 and 48 disposed on diametrically opposite sides of the axes of the rotor 36, each time a tooth 42 is alined with the core 46 of the coil 44 the diametrically opposed tooth is alined with the core 50 of the coil 48 thereby providing a magnetic flux path of relatively low magnetic reluctance from the north pole of the magnet 24 in series through a portion of the end plate 22, the core 50 of the coil 48, the small air gap between said coil and the adjacent rotor tooth 42, the central portion of the rotor to the diametrically opposite rotor tooth 42, the small air gap between said last-mentioned rotor tooth and the core 46 of the coil 44, the core 46 and then through a portion of the generator end plate to the south pole of the magnet 24. Accordingly, as the rotor 36 rotates, the magnetic flux through the core of each coil 44 and 48 periodically changes at the same time and at a frequency equal to the speed of rotation of the rotor multiplied by the number of rotor teeth 42 and the electric voltage impulses generated in each coil 44 and 48 will have this same frequency. Also, since the stub shaft 30 is of non-magnetic material, such as brass, the magnetic flux through the coil core 46 is always substantially the same as that through the coil core 50.

It has been found that with the coils 44 and 48 on diametrically opposite sides of the rotor axis, as illustrated, voltage impulses of unexpectedly large amplitude are generated in the coils 44 and 48 such that the counter 52 can be directly connected to said coils without any interposed amplifier for accurate counting of said pulses even though the rotor is operated at speeds as low as 100 R. P. M. It is thought that this unexpected large amplitude of the generated impulse voltages in the coils 44 and 48 at low generator speeds may result from the residual magnetism remaining in each tooth 42 as said tooth travels from one coil to the other and from the periodic reversal of the direction of the magnetic flux through each tooth 42 as said tooth rotates from one coil to the other.

With the coils disposed within the cylindrical magnet 24 between the end plates 20 and 22, the coils 44 and 48 are completely shielded from any stray magnetic fields thereby avoiding errors which might otherwise result from the counting of electric pulses generated in the coils 44 and 48 as a result of stray magnetic fields.

As illustrated, the rotor 42 has 10 teeth. If the counter 52 is set to count pulses supplied to it during intervals of six seconds, the reading of the counter 52 will directly indicate the speed of the rotor 36 and shaft 10 in revolutions per minute (R. P. M.). If a rotor having a larger number of teeth is substituted for the rotor 36 the counting interval may be correspondingly reduced and the counter 52 will directly indicate the R. P. M. of the shaft 10. For example if the rotor has sixty teeth, the counter 52 will directly indicate the R. P. M. of the generator rotor if the counter is set to count electric pulses supplied to it during one second intervals. Such a rotor is illustrated in Figs. 3 and 4.

Figs. 3 and 4 illustrate a rotor 60 having sixty equally spaced teeth 62 extending radially therefrom whereby as illustrated the angular spacing of the teeth 62 is 6°. The rotor 60 can be substituted directly for the rotor 36 in the impulse generator 14. The inter-tooth spaces of the rotor should be wider than the width of the cores of the pickup coils to provide well defined pulses and yet each tooth must be sufficiently wide for proper strength and vibration resistance. This presents a problem when the rotor has a large number of teeth. In Figs. 3 and 4 each axial end face of each rotor tooth is provided with an axially-extending end portion 64 of reduced width whereby the width of the inter-tooth spaces at the tooth ends is increased without decreasing the width of the main portion of the tooth.

The toothed rotor 60 may be fabricated from a disc by first forming an annular channel 66 in each end face of the disc co-axial with the disc axis, the outer periphery of said annular channels having a radius equal to the radius of the root ends of the teeth 62 to be formed. Then a plurality of circumferentially-spaced radial grooves 68 are machined in each end face of the rotor from the rotor periphery to the annular channel 66 in said face. The grooves 68 in one end face of the rotor are axially alined with the grooves 68 in the other end face and said grooves have a depth substantially equal to the depth of the channels 66. The periphery of the rotor is then radially slotted at 70 midway along each radial groove 68 to form the rotor teeth 62 with the grooves 68 forming the tooth projections 64. With each radial groove 68 having parallel sides, each tooth end portion 64 has a wedge-shaped cross-section, as illustrated, so that in Figs. 3 and 4 each coil core 46 and 50 preferably has a corresponding wedge-shaped cross-section.

Instead of and/or in addition to increasing the frequency of the generator output by increasing the number of teeth on the generator rotor, as in Figs. 3-4, said frequency can be increased by means of any conventional frequency doubler circuit connected to the generator output. In addition, the frequency of the generator output can be increased by using a plurality of pairs of pick-up coils. Such a modification of Fig. 1 is schematically illustrated in Fig. 5.

Except for the added pick-up coils and the circuit connections for said coils, the generator of Fig. 5 is like that of Fig. 1. Fig. 5 comprises a development of the rotor teeth 42 with the pick-up coils 44 and 48. Two additional pairs of pick-up coils 44a and 48a and 44b and 48b are also provided. The pick-up coils are disposed so that there is an equal angular spacing between each pair of angularly adjacent coils. Also, like the coils 44 and 48, the pair of coils 44a and 48a are disposed on diametrically opposite sides of the rotor axis and on opposite sides of the rotor ends and the pair of coils 44b and 48b are similarly disposed. In addition, the pick-up coils are disposed so that they alternate from one side of the rotor to the other so as to obtain the previously discussed periodic reversal of the magnetic flux through each rotor tooth as the tooth moves from one pick-up coil to the next pick-up coil. This latter feature obviously requires that an odd number of pairs of pick-up coils be provided.

The pick-up coils 44 and 48 are connected in parallel to a primary winding 82 of a transformer 80 with the generated voltages of said coils in phase. The pair of pick-up coils 44a and 48a and the pair of pick-up coils 44b and 48b are similarly connected in parallel to primary windings 84 and 86 respectively of said transformer 80. The secondary winding 88 of said transformer 80 is connected to the counter 52. With this construction of Fig. 5 the frequency of the electric signal supplied to the counter is three times the signal frequency of Figs. 1 and 2. Thus in Fig. 5, with the rotor having ten teeth 42 and with three pairs of pick-up coils, the frequency of the generated pulses supplied to the counter 52 will be 30 pulses per rotor revolution or three times the frequency with but one pair of pick-up coils, as in Fig. 1. Accordingly, in Fig. 5 the counter 52 will directly indicate the R. P. M. of the generator if said counter is set to count the electric pulses during successive two second intervals.

Referring again to Figs. 1–4, instead of the two pick-up coils 44 and 48, one of said coils could be eliminated leaving the ferromagnetic core of said coil. With this arrangement, the previously described periodic reversal of the magnetic flux in the rotor teeth would still take place so that elimination of said one coil (but not its core) would have substantially no effect on the generated voltage in the other coil. It has been found however that the output of the generator is more stable when the generator includes a pair of coils as illustrated. Obviously in Fig. 5, one of the two coils of each pair could likewise be eliminated.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. An electric impulse generator comprising a hollow cylindrical permanent-type magnet having a north pole at one end and a south pole at the other end; a rotor of ferromagnetic material co-axially mounted within said cylindrical magnet intermediate the ends of said magnet, said rotor having a central portion and a plurality of equally-spaced teeth extending outwardly from said central portion; and a pair of electrically connected coils disposed on opposite sides of the rotor ends; each of said coils having a core of ferromagnetic material, one of said coil cores having a low-magnetic-reluctance connection at one end with one pole of the magnet and having its other end disposed adjacent to the path of rotation of the rotor teeth and the other of said coil cores having a low-magnetic-reluctance connection at one end with the other pole of said magnet and having its other end disposed adjacent to the path of rotation of the rotor teeth, said coil cores being circumferentially-spaced relative to the rotor axis so that when one rotor tooth is disposed adjacent to one of said coil cores another rotor tooth is similarly disposed adjacent to the other coil core to form a series magnetic path of relatively low magnetic reluctance from one pole of the magnet, through the adjacent coil core, the adjacent rotor tooth, the central portion of the rotor, the rotor tooth adjacent to the other coil core, the other coil core and thence to the other pole of said magnet such that the direction of the magnetic flux through each rotor tooth periodically reverses upon movement of said tooth from one of said coils to the other.

2. An electric impulse generator comprising a hollow cylindrical permanent-type magnet having a north pole at one end and a south pole at the other end; a rotor of ferromagnetic material co-axially mounted within said cylindrical magnet intermediate the ends of said magnet, said rotor having a central portion and an even number of equally-spaced teeth extending outwardly from said central portion; and a pair of electrically connected coils disposed on axially opposite sides of the rotor ends, each of said coils having a core of ferromagnetic material with its core having a low-magnetic-reluctance connection at one end with the adjacent pole of the magnet and having its other end disposed adjacent to the path of rotation of the rotor teeth, said coils being disposed on diametrically opposite sides of the rotor axis so that when one rotor tooth is disposed adjacent to one coil core the diametrically opposite rotor tooth is similarly disposed adjacent to the other coil core to form a series magnetic path of relatively low magnetic reluctance from one pole of said magnet through the adjacent coil core, the adjacent rotor tooth, the central portion of said rotor, the diametrically opposite rotor tooth, the other coil core and thence to the other pole of said magnet such that the direction of the magnetic flux through each rotor tooth periodically reverses upon movement of said tooth from one of said coils to the other.

3. An electric impulse generator as recited in claim 2 and including a shaft portion drivably connected to said rotor, said shaft portion being of non-magnetic material.

4. An electric impulse generator as recited in claim 2 and including plates of ferromagnetic material connected across the ends of said magnet.

5. An electric impulse generator comprising a hollow cylindrical permanent-type magnet having a north pole at one end and a south pole at the other end; a pair of plates of ferromagnetic material connected across the ends of said cylindrical magnet; a rotor of ferromagnetic material co-axially mounted within said hollow cylindrical magnet, said rotor having a central portion and an even number of equally spaced teeth extending outwardly from said central portion; and a pair of coils electrically connected in parallel and disposed on axially opposite sides of the rotor ends, each of said coils having a core of ferromagnetic material with one end of each core being disposed adjacent to the path of rotation of the rotor teeth and with the other end of each core engaging the adjacent end plate so that said plate forms a low-magnetic-reluctance connection between the adjacent pole of the magnet and said core, said coils being disposed on diametrically opposite sides of the rotor axis so that when one rotor tooth is disposed adjacent to one coil core the diametrically opposite rotor tooth is similarly disposed adjacent to the other coil core to form a series magnetic path of relatively low magnetic reluctance from one pole of said magnet through a portion of the adjacent end plate, the adjacent coil core, the adjacent rotor tooth, the central portion of the rotor, the diametrically opposite rotor tooth, the other coil core, and thence through a portion of the other end plate to the other pole of the magnet such that the direction of the magnetic flux through each rotor tooth periodically reverses upon movement of said tooth from one of said coils to the other.

6. An electric impulse generator as recited in claim 5 and including a shaft portion extending through one of said end plates and drivably connected to said rotor, said shaft portion being of non-magnetic material.

7. An electric impulse generator comprising a rotor of ferromagnetic material having a central portion and a plurality of equally spaced teeth extending outwardly from said central portion; permanent magnet means surrounding said rotor; an electric coil having a core of ferromagnetic material, said core having a low-magnetic-reluctance connection with one pole of the magnet means and having a portion disposed adjacent to the path of rotation of the rotor teeth; ferromagnetic means having a low-magnetic-reluctance connection with the other pole of the magnet means and having a portion disposed adjacent to the path of rotation of the rotor teeth, said coil core and said ferromagnetic means being circumferentially-spaced relative to the rotor axis so that when one rotor tooth is disposed adjacent to said coil core another rotor tooth is similarly disposed adjacent to said ferromagnetic means to form a magnetic path of relatively low magnetic reluctance from one pole of the magnetic means to the other through a series path including said coil core, the adjacent rotor tooth, the central portion of the rotor, the rotor tooth adjacent to said ferromagnetic means and said ferromagnetic means, the end portion of each rotor tooth rotatable along a path adjacent to said coil being of reduced width.

8. An electric impulse generator comprising a hollow cylindrical permanent-type magnet having a north pole at one end and a south pole at the other end; a rotor of ferromagnetic material co-axially mounted within said cylindrical magnet intermediate the ends of said magnet, said rotor having a central portion and a plurality of equally-spaced teeth extending outwardly from said central portion, an electric coil having a core of ferromagnetic material, said core having a low-magnetic-reluctance connection with one pole of said magnet and having a portion disposed on one side of the rotor adjacent to the path of rotation of said rotor teeth; and ferromagnetic means having a low-magnetic-reluctance connection with the other pole of said magnet and having a portion disposed adjacent to the path of rotation of said rotor teeth on the side of said rotor opposite to said coil core, said coil core and ferromagnetic means being circumferentially-spaced relative to the rotor axis so that when one rotor tooth is disposed adjacent to said coil core another rotor tooth is similarly disposed adjacent to said ferromagnetic means to form a magnetic path of relatively low magnetic reluctance from one pole of the magnet to the other through a series path including said coil core, the adjacent rotor tooth, the central portion of the rotor, the rotor tooth adjacent to said ferromagnetic means and said ferromagnetic means such that the direction of the magnetic flux through each rotor tooth periodically reverses upon movement of said tooth from said coil to said ferromagnetic means and from said ferromagnetic means to said coil.

9. An electric impulse generator as recited in claim 2 and including additional pairs of coils disposed and electrically connected together similar to the first mentioned pair of coils and making an odd number of coil pairs, said coils being disposed so that there is an equal angular spacing between angularly adjacent coils and so that the coils alternate from one axial side of the rotor to the other.

HAROLD K. SPAULDING.

References Cited in the file of this patent

UNITED STATES PATENTS

| Number | Name | Date |
|---|---|---|
| 276,136 | Drawbaugh | Apr. 17, 1883 |
| 2,467,211 | Hornfeck | Apr. 12, 1949 |

FOREIGN PATENTS

| Number | Country | Date |
|---|---|---|
| 8,173 | Great Britain | of 1907 |
| 24,302 | Great Britain | of 1903 |
| 159,052 | France | Dec. 8, 1883 |